US012176563B2

United States Patent
Spangler et al.

(10) Patent No.: US 12,176,563 B2
(45) Date of Patent: Dec. 24, 2024

(54) STEEL ROCKER ENERGY ABSORPTION LOAD PATH DEVELOPMENT FOR RECHARGEABLE ENERGY STORAGE SYSTEM PROTECTION

(71) Applicant: GM GLOBAL TECHNOLOGY OPERATIONS LLC, Detroit, MI (US)

(72) Inventors: Jennifer L. Spangler, Milford, MI (US); Travis W. Walker, Rochester Hills, MI (US); James L. Veal, Jr., Macomb Township, MI (US); Dante C. Zuccaro, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 163 days.

(21) Appl. No.: 17/505,372

(22) Filed: Oct. 19, 2021

(65) Prior Publication Data

US 2023/0117003 A1  Apr. 20, 2023

(51) Int. Cl.
   *H01M 50/242* (2021.01)
   *B60K 1/04* (2019.01)
   *H01M 50/224* (2021.01)

(52) U.S. Cl.
   CPC ....... *H01M 50/242* (2021.01); *H01M 50/224* (2021.01); *B60K 1/04* (2013.01); *B60Y 2306/01* (2013.01); *H01M 2220/20* (2013.01)

(58) Field of Classification Search
   CPC ............. H01M 50/242; H01M 50/224; H01M 2220/20; B60K 1/04; B60Y 2306/01
   See application file for complete search history.

(56) References Cited

U.S. PATENT DOCUMENTS

| 2012/0073227 A1* | 3/2012 | Urusoglu | E04B 1/161 52/309.4 |
|---|---|---|---|
| 2020/0023905 A1* | 1/2020 | Kawase | B62D 25/025 |
| 2020/0207221 A1* | 7/2020 | Matecki | B60L 50/64 |

(Continued)

FOREIGN PATENT DOCUMENTS

| CN | 109565011 A | * | 4/2019 | .......... H01M 2/1072 |
|---|---|---|---|---|
| CN | 112739611 A | * | 4/2021 | |

(Continued)

OTHER PUBLICATIONS

U.S. Appl. No. 16/788,854, filed Feb. 12, 2020, Walker et al.

*Primary Examiner* — Christopher P Domone
*Assistant Examiner* — Jonathan William Estes (57) ABSTRACT

A rechargeable energy storage system includes a plurality of battery cells and a wall structure disposed adjacent to the plurality of battery cells and having an inner layer and an outer layer. An interior reinforcement structure includes a first sheet metal member and a second sheet metal member each having a plurality of vertical sections and a plurality of horizontal sections. The first and second sheet metal members define an aligned load transfer section wherein one of the plurality of horizontal sections of the first sheet metal member is vertically aligned with one of the plurality of horizontal sections of the second sheet metal member. The first and second sheet metal members define a crush region wherein one of the plurality of horizontal sections of the first sheet metal member is vertically misaligned with all of the plurality of horizontal sections of the second sheet metal member.

20 Claims, 6 Drawing Sheets

(56) References Cited

U.S. PATENT DOCUMENTS

2021/0309297 A1\* 10/2021 Matecki .............. B62D 25/025
2023/0192196 A1\* 6/2023 Gonda ................. B62D 21/11
  296/204

FOREIGN PATENT DOCUMENTS

DE      102016223492    \*  4/2018  ............. B62D 25/02
WO    WO-2018029168 A1 \*  2/2018  .......... H01M 2/1072

\* cited by examiner

STEEL ROCKER ENERGY ABSORPTION LOAD PATH DEVELOPMENT FOR RECHARGEABLE ENERGY STORAGE SYSTEM PROTECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a wall structure for a rechargeable energy storage system of a vehicle. The wall structure uses sheet metal components to promote energy absorption by providing portions of the wall structure with load transfer constructions and other portions with energy absorption constructions.

SUMMARY

A rechargeable energy storage system includes a plurality of battery cells and a wall structure disposed adjacent to the plurality of battery cells and having an inner layer and an outer layer. An interior reinforcement structure includes a first sheet metal member and a second sheet metal member each bent into a plurality of vertical sections and a plurality of horizontal sections. The first and second sheet metal members define an aligned load transfer section wherein one of the plurality of horizontal sections of the first sheet metal member is vertically aligned with one of the plurality of horizontal sections of the second sheet metal member. The first and second sheet metal members define a crush region wherein one of the plurality of horizontal sections of the first sheet metal member is vertically misaligned with all of the plurality of horizontal sections of the second sheet metal member.

According to a further aspect, the first sheet metal member is connected to one of the inner layer and the outer layer and the second sheet metal member is connected to the other of the inner layer and the outer layer.

According to a further aspect, the first sheet metal member is welded to one of the inner layer and the outer layer and the second sheet metal member is welded to the other of the inner layer and the outer layer.

According to a further aspect, at least one of the first sheet metal member and the second sheet metal member is connected to one of the inner layer and the outer layer by a support bracket.

According to a further aspect, one of the first sheet metal member and the second sheet metal member includes at least one of the plurality of horizontal section extending from the inner layer to the outer layer.

According to a further aspect, the rechargeable energy storage system includes a sheet metal structure formed into a side-by-side double box cross section that include a first box cross section disposed adjacent to the inner layer and a second box cross section disposed adjacent to the outer layer.

According to a further aspect, the side-by-side double box cross-section is formed from a third sheet metal member.

According to a further aspect, the side-by-side double box cross-section is formed from a third sheet metal member and a fourth sheet member.

According to a further aspect, the sheet metal structure formed into a side-by-side double box cross-section is supported between the inner layer and the outer layer by at least one support bracket.

According to a further aspect, the first sheet metal member and the outer layer define a box structure along a lower end of the outer layer.

According to a further aspect of the present disclosure a rechargeable energy storage system including a plurality of battery cells with a wall structure disposed adjacent to the plurality of battery cells and having an inner layer and an outer layer. An interior reinforcement structure is made from sheet metal and is disposed between the inner layer and the outer layer. The interior reinforcement structure includes a first sheet metal member connected to one of the inner layer and the outer layer and having a plurality of vertical sections and a plurality of horizontal sections. The first sheet metal member includes at least one of the plurality of horizontal sections extending from the inner layer to the outer layer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
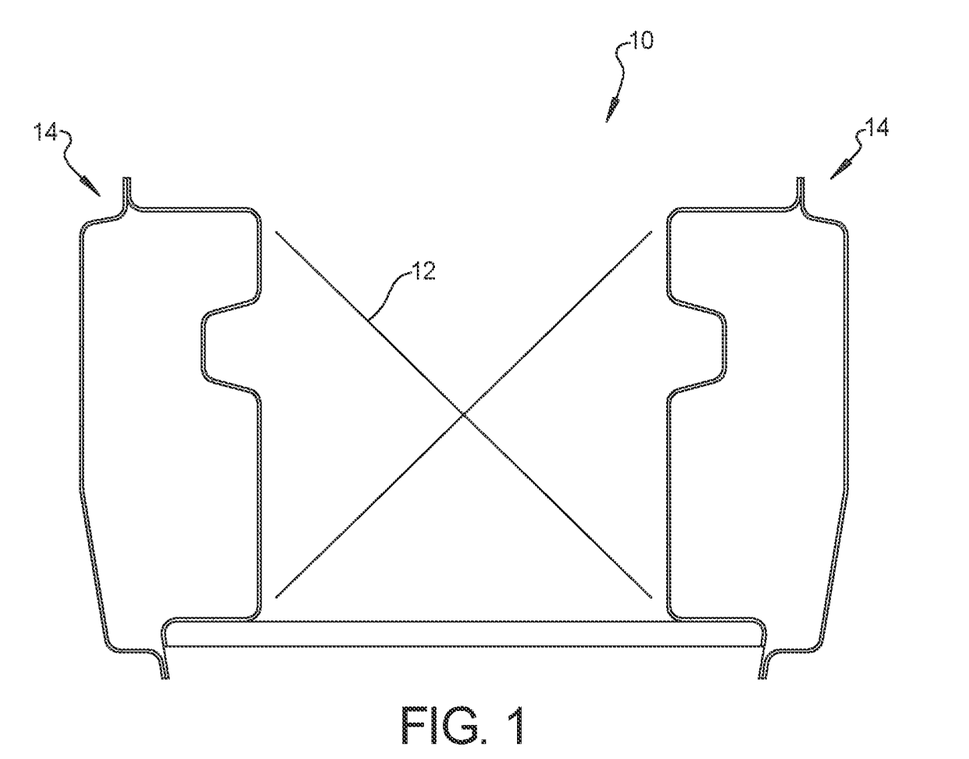
FIG. 1 is a cross-sectional view of a rechargeable energy storage system according to the principles of the present disclosure.

With reference to FIG. 1, a rechargeable energy storage system 10 is shown including a plurality of battery cells 12 and a wall structure 14 disposed on opposite sides of the battery cells 12.

Figure 2:
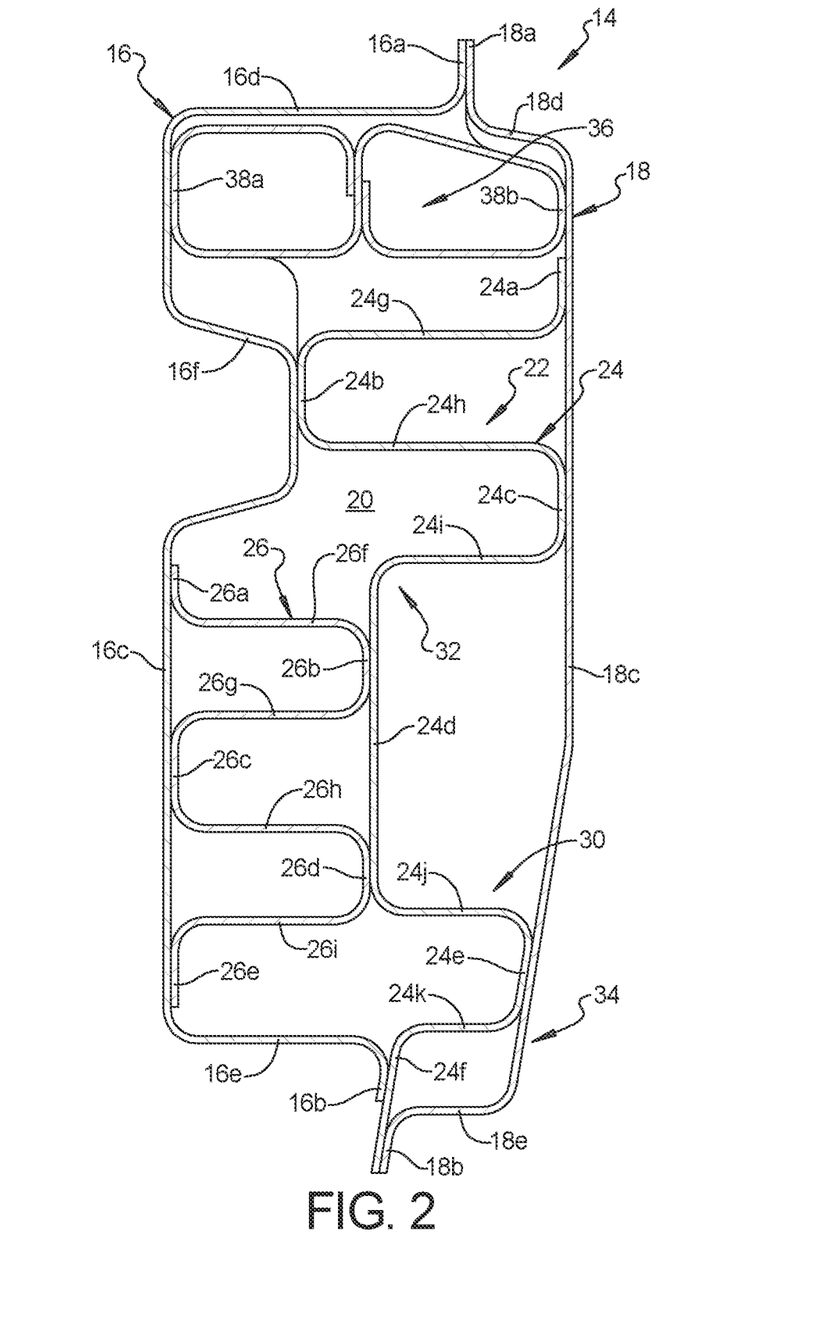
FIG. 2 is a cross-section view of a wall structure of a rechargeable energy storage system according to a first embodiment.

With reference to FIG. 2, a vertical cross section through the wall structure 14 is shown. The wall structure includes an inner layer 16 on an inboard side relative to the plurality of battery cells and an outer layer 18 on an outboard side relative to the plurality of battery cells. The inner and outer layers 16, 18 can be made from sheet metal and can be secured together along a top edge 16a, 18a and a bottom edge 16b, 18b for defining a chamber 20 therebetween. The top edges 16a, 18a and the bottom edge 16b, 18b can be in the form of a bent flange that can be welded together or otherwise fastened using known connection techniques. The inner layer 16 includes a vertical wall section 16c and upper and lower horizontal wall sections 16d, 16e. The vertical wall section 16c can be provided with an indent portion 16f. The outer layer 18 includes a vertical wall section 18c and upper and lower horizontal wall sections 18d, 18e.

The wall structure 14 includes an interior wall reinforcement structure 22 disposed with the chamber 20 between the inner layer and the outer layer. The interior reinforcement structure 22 is made from sheet metal and can include a first sheet metal member 24 having a plurality of vertical sections 24a-f that are alternating with a plurality of horizontal sections 24g-k. The plurality of alternating vertical and horizontal sections 24a-f/24g-k create a zig-zag shape. The interior wall reinforcement structure 22 includes a second sheet metal member 26 having a plurality of vertical sections 26a-e that are alternating with a plurality of horizontal sections 26f-i. The plurality of alternating vertical and horizontal sections 26a-e/26f-i create a zig-zag shape. The vertical sections 24a, 24c, 24e, 24f of the first sheet metal member 24 and the vertical sections 26a, 26c, 26e of the second sheet metal member 26 can be welded to the outer layer 18 and the inner layer 16, respectively. Laser welding, vibration welding, Metal Inert Gas (MIG) welding and other known welding techniques can be used.

The first sheet metal member 24 and the second sheet metal member 26 combine to define an aligned load transfer section 30 wherein one of the plurality of horizontal sections 24j of the first sheet metal member 24 is vertically aligned with one of the plurality of horizontal sections 26i of the second sheet metal member 26 thereby providing a rigid reinforcement structure in that aligned load transfer section 30. The first sheet metal member 24 and the second sheet metal member 26 define a crush region 32 wherein one of the plurality of horizontal sections 24i of the first sheet metal member 24 is vertically misaligned with all of the plurality of horizontal sections 26f-I of the second sheet metal member 26 thereby providing a portion of the vertical section 24d of the first sheet metal member 24 being opposed to one or more of the horizontal sections 26 f, 26g.

The lower most horizontal section 24k and the lower most vertical section 24f of the first sheet metal member 24 combine with a lower end of the vertical wall 18c and the lower horizontal wall section 18e to create a box structure 34 at the lower end of the wall structure 14 to direct more load to the lower end of the wall structure 14.

The upper horizontal sections 24g, 24h of the first sheet metal member 24 extend from the outer layer 18 to the inner layer 16 and provide a rigid reinforcement to direct more load to the region of the wall 14 with the upper horizontal sections 24g, 24h.

The interior wall reinforcement structure 22 further includes a sheet metal structure 36 formed into a side-by-side double box cross section that includes a first box cross section 38a disposed adjacent to the inner layer 16 and a second box cross section 38b disposed against the first box cross section 38a and adjacent to the outer layer 18.

Figure 3:
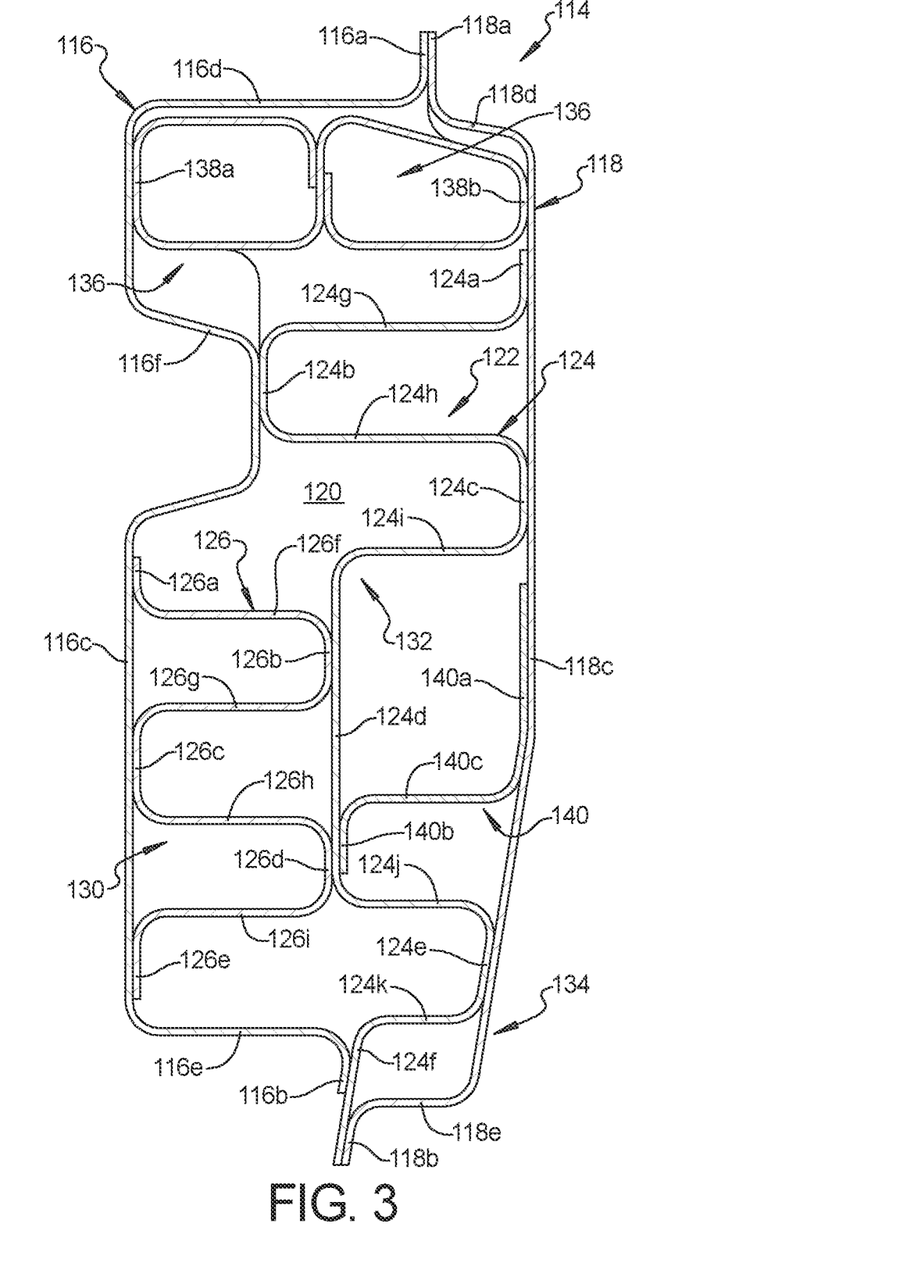
FIG. 3 is a cross-section view of a wall structure of a rechargeable energy storage system according to a second embodiment.

The interior wall reinforcement structure 22 can take on alternative forms as represented by additional embodiments as shown in FIGS. 3-6. With reference to FIG. 3, a vertical cross section through the exemplary wall structure 114 is shown. The wall structure 114 includes an inner layer 116 on an inboard side relative to the plurality of battery cells and an outer layer 118 on an outboard side relative to the plurality of battery cells. The inner and outer layers 116, 118 can be made from sheet metal and can be secured together along a top edge 116a, 118a and a bottom edge 116b, 118b for defining a chamber 120 therebetween. The top edges 116a, 118a and the bottom edge 116b, 118b can be in the form of a bent flange that can be welded together or otherwise fastened using known connection techniques. The inner layer 116 includes a vertical wall section 116c and upper and lower horizontal wall sections 116d, 116e. The vertical wall section 116c can be provided with an indent portion 116f. The outer layer 118 includes a vertical wall section 118c and upper and lower horizontal wall sections 118d, 118e.

The wall structure 114 includes an interior wall reinforcement structure 122 disposed with the chamber 120 between the inner layer and the outer layer. The interior reinforcement structure 122 is made from sheet metal and can include a first sheet metal member 124 having a plurality of vertical sections 124a-f that are alternating with a plurality of horizontal sections 24g-k. The plurality of alternating vertical and horizontal sections 124a-f/124g-k create a zig-zag shape. The interior wall reinforcement structure 122 includes a second sheet metal member 126 having a plurality of vertical sections 126a-e that are alternating with a plurality of horizontal sections 126f-i. The plurality of alternating vertical and horizontal sections 126a-e/126f-i create a zig-zag shape. The vertical sections 124a, 124c, 24e, 24f of the first sheet metal member 124 and the vertical sections 126a, 126c, 126e of the second sheet metal member 126 can be welded to the outer layer 118 and the inner layer 116, respectively. Laser welding, vibration welding, Metal Inert Gas (MIG) welding and other known welding techniques can be used.

The first sheet metal member 124 and the second sheet metal member 126 combine to define an aligned load transfer section 130 wherein one of the plurality of horizontal sections 124j of the first sheet metal member 124 is vertically aligned with one of the plurality of horizontal sections 126i of the second sheet metal member 126 thereby providing a rigid reinforcement structure in that aligned load transfer section 130. The first sheet metal member 124 and the second sheet metal member 126 define a crush region 132 wherein one of the plurality of horizontal sections 124i of the first sheet metal member 124 is vertically misaligned with the plurality of horizontal sections 126f-h of the second sheet metal member 126 thereby providing a portion of the horizontal sections 126f-h of the second sheet metal member 126 being opposed to the vertical section 124d.

The lower most horizontal section 124k and the lower most vertical section 124f of the first sheet metal member 124 combine with a lower end of the vertical wall 118c and the lower horizontal wall section 118e to create a box structure 134 at the lower end of the wall structure 114 to direct more load to the lower end of the wall structure 114.

The upper horizontal sections 124g, 124h of the first sheet metal member 124 extend from the outer layer 118 to the inner layer 116 and provide a rigid reinforcement to direct more load to the region of the wall 114 with the upper horizontal sections 124g, 124h.

The interior wall reinforcement structure 122 further includes a sheet metal structure 136 formed into a side-by-side double box cross section that includes a first box cross section 138a disposed adjacent to the inner layer 116 and a second box cross section 138b disposed against the first box cross section 138a and adjacent to the outer layer 118. An additional sheet metal reinforcement structure can be provided in the form of a sheet metal member 140 providing additional or supplemental support to a portion of one of the first sheet metal member 124 and/or the second sheet metal member 126. In the example shown, the sheet metal member 140 includes first and second vertical sections 140a, 140b and a horizontal section 140c therebetween. The vertical section 140a is welded to the outer layer 118 and the vertical section 140b is disposed adjacent to the vertical section 124d to provide added support thereto.

Figure 4:
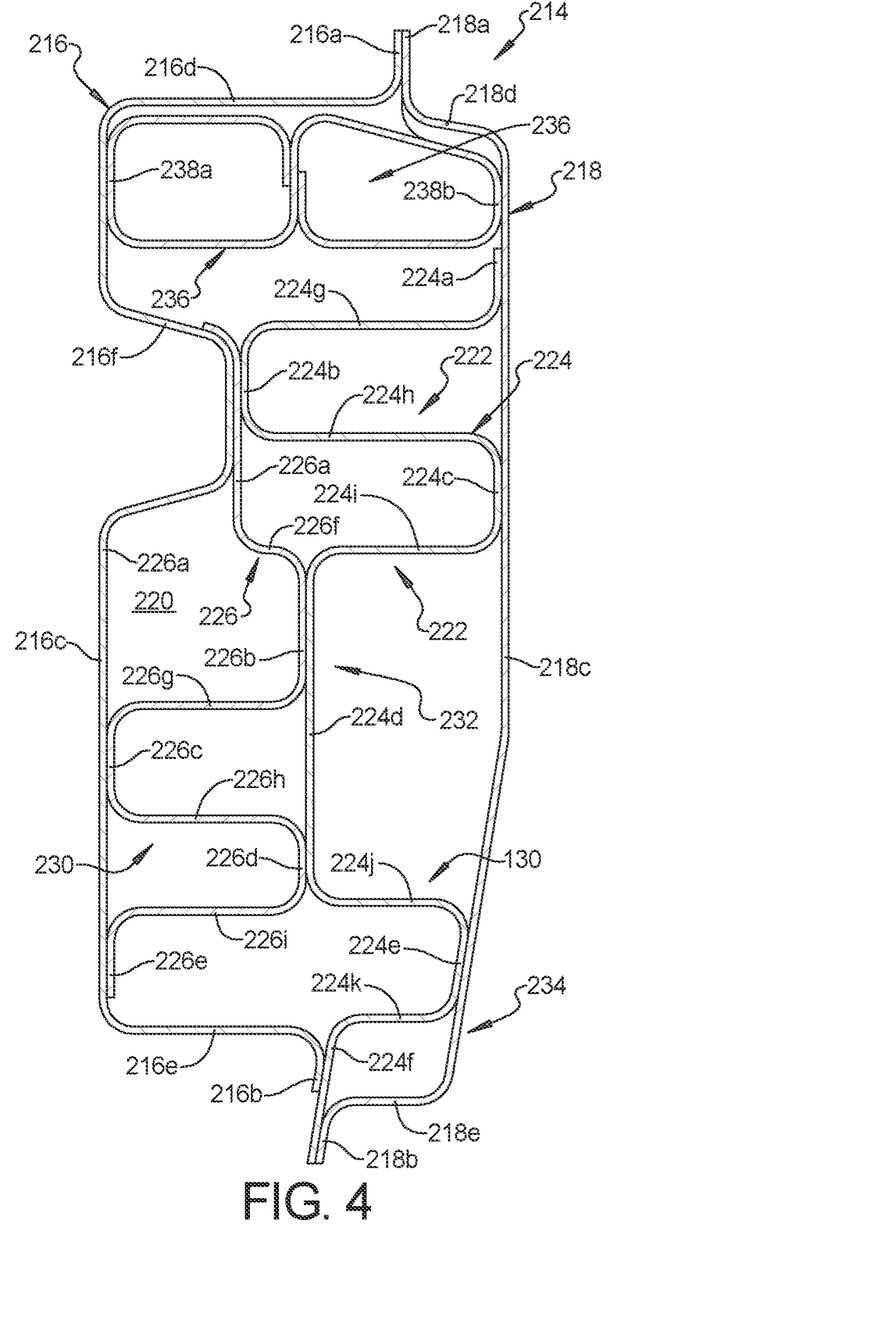
FIG. 4 is a cross-section view of a wall structure of a rechargeable energy storage system according to a third embodiment.

With reference to FIG. 4, a vertical cross section through the exemplary wall structure 214 is shown. The wall structure 214 includes an inner layer 216 on an inboard side relative to the plurality of battery cells and an outer layer 218 on an outboard side relative to the plurality of battery cells. The inner and outer layers 216, 218 can be made from sheet metal and can be secured together along a top edge 216a, 218a and a bottom edge 216b, 218b for defining a chamber 220 therebetween. The top edges 216a, 218a and the bottom edge 216b, 218b can be in the form of a bent flange that can be welded together or otherwise fastened using known connection techniques. The inner layer 216 includes a vertical wall section 216c and upper and lower horizontal wall sections 216d, 216e. The vertical wall section 216c can be provided with an indent portion 216f. The outer layer 218 includes a vertical wall section 218c and upper and lower horizontal wall sections 218d, 218e.

The wall structure 214 includes an interior wall reinforcement structure 222 disposed with the chamber 220 between the inner layer and the outer layer. The interior reinforcement structure 222 is made from sheet metal and can include a first sheet metal member 224 having a plurality of vertical sections 224a-f that are alternating with a plurality of horizontal sections 224g-k. The plurality of alternating vertical and horizontal sections 224a-f/224g-k create a zig-zag shape. The interior wall reinforcement structure 222 includes a second sheet metal member 226 having a plurality of vertical sections 226a-e that are alternating with a plurality of horizontal sections 226f-i. The plurality of alternating vertical and horizontal sections 226a-e/226f-i create a zig-zag shape. The vertical sections 224a, 224c, 224e, 224f of the first sheet metal member 224 and the vertical sections 226a, 226c, 226e of the second sheet metal member 226 can be welded to the outer layer 218 and the inner layer 216, respectively. Laser welding, vibration welding, Metal Inert Gas (MIG) welding and other known welding techniques can be used.

The first sheet metal member 224 and the second sheet metal member 226 combine to define an aligned load transfer section 230 wherein one of the plurality of horizontal sections 224j of the first sheet metal member 224 is vertically aligned with one of the plurality of horizontal sections 226i of the second sheet metal member 226 thereby providing a rigid reinforcement structure in that aligned load transfer section 230. The first sheet metal member 224 and the second sheet metal member 226 define a crush region 232 wherein one of the plurality of horizontal sections 226g of the second sheet metal member 226 is vertically misaligned with the plurality of horizontal sections 224g-k of the first sheet metal member 224 thereby providing a portion of the horizontal section 226g of the second sheet metal member 226 being opposed to the vertical section 224d.

The lower most horizontal section 224k and the lower most vertical section 224f of the first sheet metal member 224 combine with a lower end of the vertical wall 218c and the lower horizontal wall section 218e to create a box structure 234 at the lower end of the wall structure 214 to direct more load to the lower end of the wall structure 214.

The upper horizontal sections 224g, 224h of the first sheet metal member 224 extend from the outer layer 218 to the inner layer 216 and provide a rigid reinforcement to direct more load to the region of the wall 214 with the upper horizontal sections 224g, 224h.

The interior wall reinforcement structure 222 further includes a sheet metal structure 236 formed into a side-by-side double box cross section that includes a first box cross section 238a disposed adjacent to the inner layer 216 and a second box cross section 238b disposed against the first box cross section 238a and adjacent to the outer layer 218.

Figure 5:
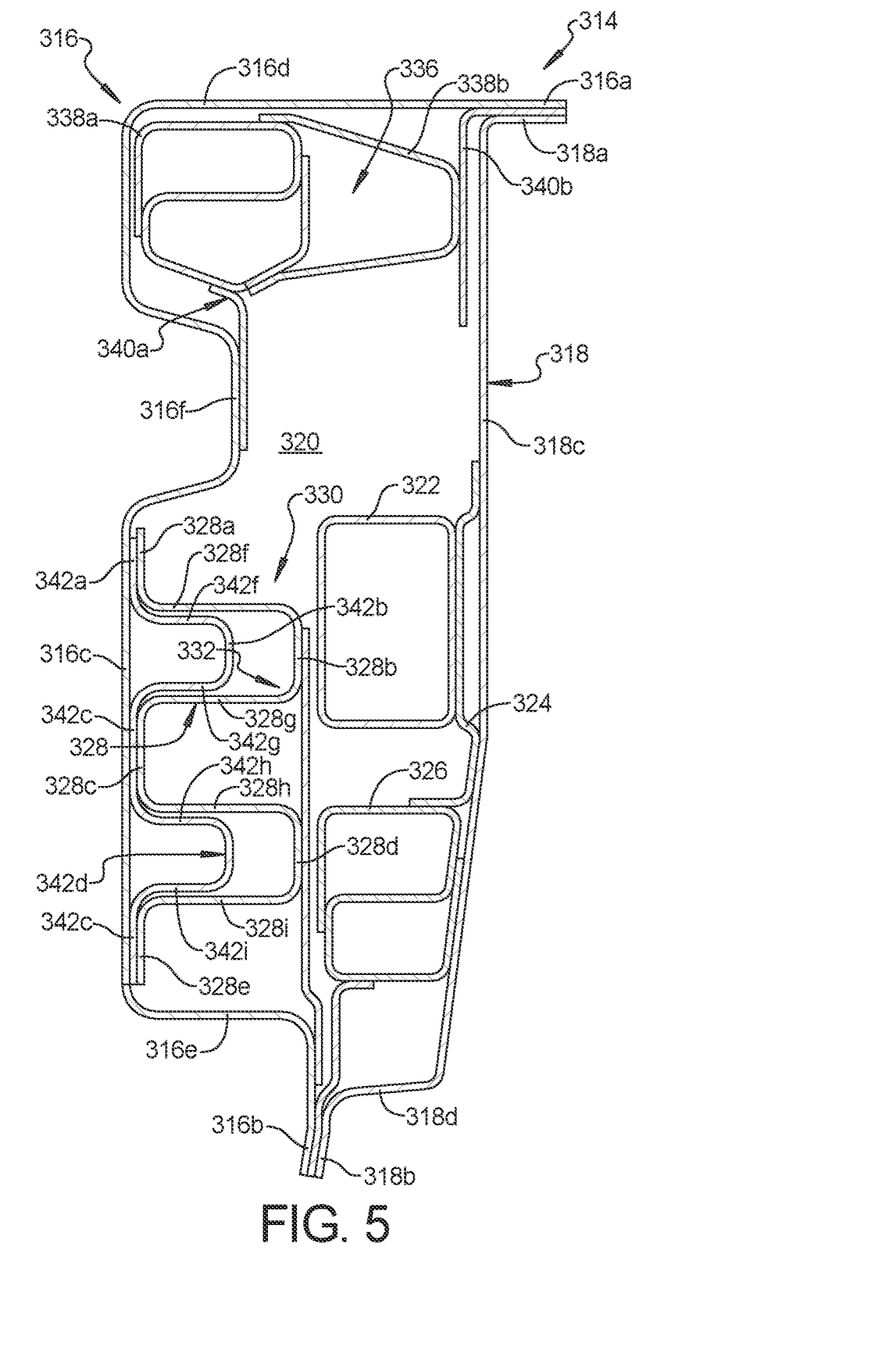
FIG. 5 is a cross-section view of a wall structure of a rechargeable energy storage system according to a fourth embodiment.

With reference to FIG. 5, a vertical cross section through the exemplary wall structure 314 is shown. The wall structure 314 includes an inner layer 316 on an inboard side relative to the plurality of battery cells and an outer layer 318 on an outboard side relative to the plurality of battery cells. The inner and outer layers 316, 318 can be made from sheet metal and can be secured together along a top edge 316a, 318a and a bottom edge 316b, 318b for defining a chamber 320 therebetween. The top edges 316a, 318a and the bottom edge 316b, 318b can be in the form of a bent flange that can be welded together or otherwise fastened using known connection techniques. The inner layer 316 includes a vertical wall section 316c and upper and lower horizontal wall sections 316d, 116e. The vertical wall section 316c can be provided with an indent portion 316f. The outer layer 318 includes a vertical wall section 318c and a lower horizontal wall section 318d.

The wall structure 314 includes an interior wall reinforcement structure disposed with the chamber 320 between the inner layer and the outer layer. The interior reinforcement structure is made from sheet metal and can include a first sheet metal member 322 formed in a box shape and connected to the outer layer 318 by welding or via a bracket 324. A second sheet metal member 326 is formed in a box shape and connected to the outer layer 318 by welding or via a bracket. The box shape of the second sheet metal member 326 can be a double box shape as shown in FIG. 5 in order to provide additional reinforcement. The interior wall reinforcement structure includes a third sheet metal member 328 having a plurality of vertical sections 328a-e that are alternating with a plurality of horizontal sections 328f-i. The plurality of alternating vertical and horizontal sections 328a-e/328f-i create a zig-zag shape. The vertical sections 328a, 328c, 328e of the third sheet metal member 328 can be welded to the inner layer 316. Laser welding, vibration welding, Metal Inert Gas (MIG) welding and other known welding techniques can be used.

The first sheet metal member 322 and the third sheet metal member 328 combine to define misaligned load transfer section 330 wherein the horizontal sections of the box-shaped cross section of the first sheet metal member 322 are vertically misaligned with the horizontal sections 328f, 328g of the third sheet metal crush section 330. The second sheet metal member 326 and the third sheet metal member 328 define a rigid reinforcement structure wherein one of the plurality of horizontal sections 328h, 328i of the third sheet metal member 328 are vertically aligned with the horizontal sections of the double box cross-section of the second sheet metal member 326 thereby providing rigid reinforced structure.

The interior wall reinforcement structure further includes a sheet metal structure 336 formed into a side-by-side double box cross section that includes a first box cross section 338a disposed adjacent to the inner layer 316 and a second box cross section 338b disposed against the first box cross section 338a and adjacent to the outer layer 318. The sheet metal structure 336 can be supported by brackets 340a, 340b that support and guide the sheet metal structure.

An additional sheet metal reinforcement structure can be provided in the form of a sheet metal member 342 providing additional or supplemental support to a portion of the third sheet metal member 328. In the example shown, the sheet metal member 342 includes vertical sections 342a-342e and horizontal sections 342f-342i therebetween. The vertical sections 342a, 342c, 342e are welded to the inner layer 316 and reinforce the third sheet metal member 328 as it is crushed to a certain degree.

Figure 6:
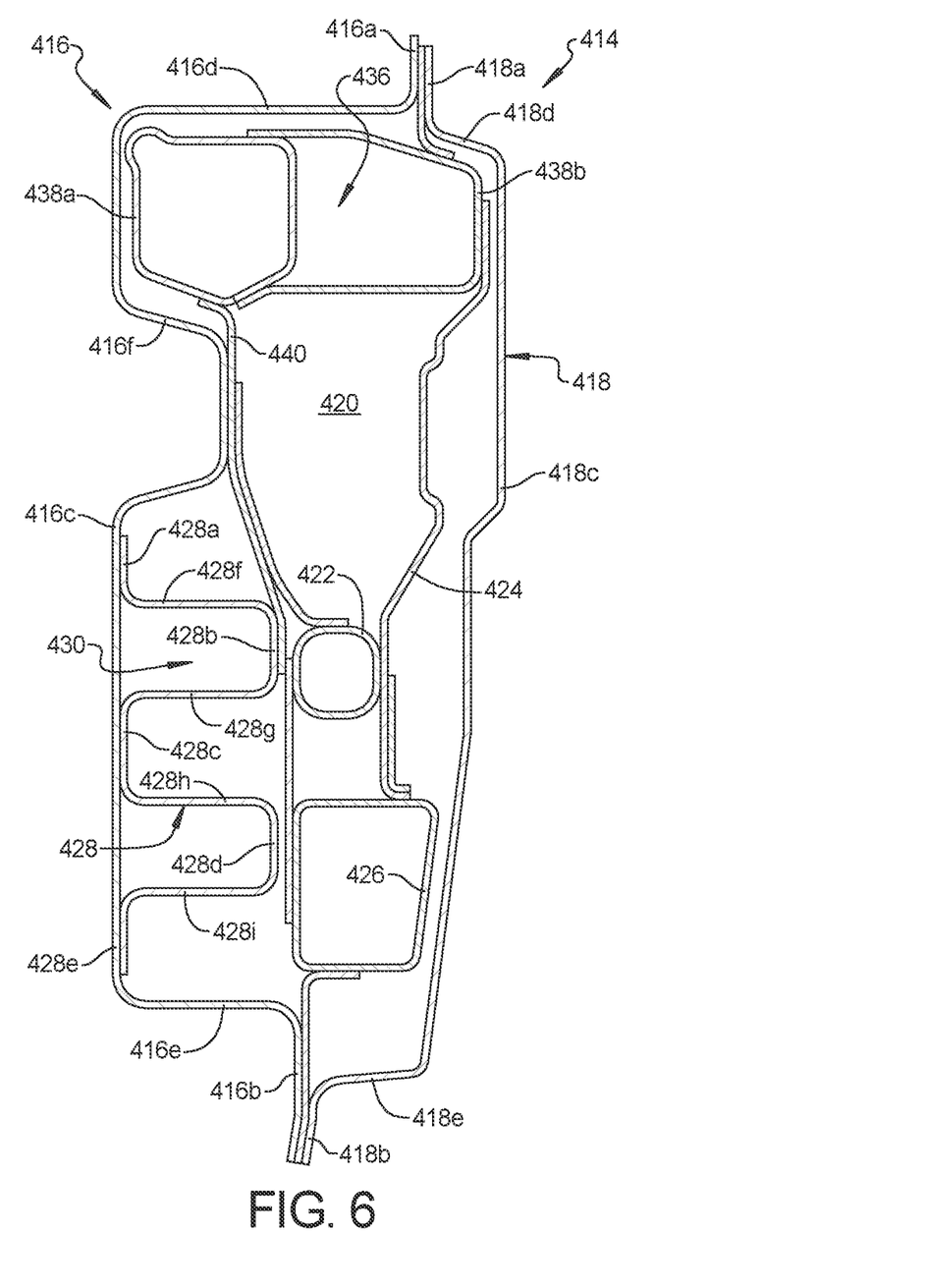
FIG. 6 is a cross-section view of a wall structure of a rechargeable energy storage system according to a fifth embodiment.

With reference to FIG. 6, a vertical cross section through the exemplary wall structure 414 is shown. The wall structure 414 includes an inner layer 416 on an inboard side relative to the plurality of battery cells and an outer layer 418 on an outboard side relative to the plurality of battery cells. The inner and outer layers 416, 418 can be made from sheet metal and can be secured together along a top edge 416a, 418a and a bottom edge 416b, 418b for defining a chamber 420 therebetween. The top edges 416a, 418a and the bottom edge 416b, 418b can be in the form of a bent flange that can be welded together or otherwise fastened using known connection techniques. The inner layer 416 includes a vertical wall section 416c and upper and lower horizontal wall sections 416d, 416e. The vertical wall section 416c can be provided with an indent portion 416f. The outer layer 418 includes a vertical wall section 418c and a lower horizontal wall section 418d.

The wall structure 414 includes an interior wall reinforcement structure disposed with the chamber 420 between the inner layer and the outer layer. The interior reinforcement structure is made from sheet metal and can include a first sheet metal member 422 formed in a box shape and connected to the outer layer 418 by a bracket 424. A second sheet metal member 426 is formed in a box shape and connected to the outer layer 418 by the bracket 424. The interior wall reinforcement structure includes a third sheet metal member 428 having a plurality of vertical sections 428a-e that are alternating with a plurality of horizontal sections 428f-i. The plurality of alternating vertical and horizontal sections 428a-e/428f-i create a zig-zag shape. The vertical sections 428a, 428c, 428e of the third sheet metal member 428 can be welded to the inner layer 416. Laser welding, vibration welding, Metal Inert Gas (MIG) welding and other known welding techniques can be used.

The first sheet metal member 422 and the third sheet metal member 428 combine to define misaligned load transfer section 430 wherein the horizontal sections of the box-shaped cross section of the first sheet metal member 422 are vertically misaligned with the horizontal sections 428f, 428g to define a crush section 430. The second sheet metal member 426 and the third sheet metal member 428 define a rigid reinforcement structure wherein one of the plurality of horizontal section 428h of the third sheet metal member 428 are vertically aligned with the horizontal sections of the double box cross-section of the second sheet metal member 426 thereby providing rigid reinforced structure. Because the second sheet metal member 426 is spaced from the outer layer 418, the outer layer is able to deflect to a certain extent before the second sheet metal member 426 and the third sheet metal members 428 reinforce against deformation.

The interior wall reinforcement structure further includes a sheet metal structure 436 formed into a side-by-side double box cross section that includes a first box cross section 438a disposed adjacent to the inner layer 416 and a second box cross section 438b disposed against the first box cross section 438a and adjacent to the outer layer 418. The sheet metal structure 436 can be supported by brackets 424 and 440 that support and guide the sheet metal structure.

It should be noted that the above described examples include various exemplary features that can be used in combination with other disclosed exemplary features.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A rechargeable energy storage system comprising:
   a plurality of battery cells;
   a wall structure disposed adjacent to the plurality of battery cells and having a first exterior layer and a second exterior layer, the first exterior layer and the second exterior layer defining an enclosed space laterally therebetween;
   an interior reinforcement structure made from sheet metal is disposed within the enclosed space and between the first exterior layer and the second exterior layer, the interior reinforcement structure including;
   a first sheet metal member laterally between the first exterior layer and the second exterior layer and connected to each of the first exterior layer and the second exterior layer and having a plurality of vertical sections and a plurality of horizontal sections, wherein the first sheet metal member includes at least one of the plurality of horizontal sections extending from and contacting the first exterior layer and extending to and contacting the second exterior layer; and
   a second sheet metal member formed into a side-by-side double box cross section that includes a first box cross section disposed adjacent to the first exterior layer and a second box cross section disposed against the first box cross section and adjacent to the second exterior layer.

2. The rechargeable energy storage system according to claim 1, wherein the first sheet metal member includes a first vertical section directly connected to the first exterior layer and a second vertical section directly connected to the second exterior layer.

3. The rechargeable energy storage system according to claim 1, wherein the first sheet metal member is connected to one of the first exterior layer and the second exterior layer by a support bracket.

4. The rechargeable energy storage system according to claim 1, further comprising a third sheet metal member connected to the first exterior layer and having a plurality of vertical sections that are alternating with a plurality of horizontal sections.

5. The rechargeable energy storage system according to claim 4, wherein the third sheet metal member is connected to the first exterior layer at plural spaced locations.

6. The rechargeable energy storage system according to claim 4, wherein the third sheet metal member is connected to the first sheet metal member.

7. The rechargeable energy storage system according to claim 4, wherein the third sheet metal member is connected to the first sheet metal member at two spaced locations.

8. The rechargeable energy storage system according to claim 1, wherein the first sheet metal member and the second exterior layer define a box structure along a lower end of the second exterior layer.

9. The rechargeable energy storage system according to claim 1, wherein the side-by-side double box structure of the second sheet metal member is at an upper end of the wall structure.

10. The rechargeable energy storage system according to claim 4, wherein a plurality of vertical sections of the third sheet metal member are connected to a single vertical section of the first sheet metal member.

11. A rechargeable energy storage system comprising:
a plurality of battery cells;
a wall structure disposed adjacent to the plurality of battery cells and having a first exterior layer and a second exterior layer, the first exterior layer and the second exterior layer defining an enclosed space therebetween;
an interior reinforcement structure made from sheet metal is disposed within the enclosed space and between the first exterior layer and the second exterior layer, the interior reinforcement structure including;
a first sheet metal member laterally between the first exterior layer and the second exterior layer and connected to each of the first exterior layer and the second exterior layer and having a plurality of vertical sections and a plurality of horizontal sections, wherein the first sheet metal member includes at least one of the plurality of horizontal sections extending from and contacting the first exterior layer and extending to and contacting the second exterior layer; and
a second sheet metal member connected to the first exterior layer and having a plurality of vertical sections alternating with a plurality of horizontal sections.

12. The rechargeable energy storage system according to claim 11, wherein the second sheet metal member is connected to the first exterior layer at plural spaced locations.

13. The rechargeable energy storage system according to claim 11, wherein the second sheet metal member is connected to the first sheet metal member.

14. The rechargeable energy storage system according to claim 11, wherein the second sheet metal member is connected to the first sheet metal member at plural spaced locations.

15. The rechargeable energy storage system according to claim 11, wherein the first sheet metal member and the second exterior layer define a box structure along a lower end of the second exterior layer.

16. The rechargeable energy storage system according to claim 11, wherein a plurality of vertical sections of the second sheet metal member are connected to a single vertical section of the first sheet metal member.

17. A rechargeable energy storage system comprising:
a plurality of battery cells;
a wall structure disposed adjacent to the plurality of battery cells and having a first exterior layer and a second exterior layer, the first exterior layer and the second exterior layer defining an enclosed space therebetween;
an interior reinforcement structure made from sheet metal is disposed within the enclosed space and between the first exterior layer and the second exterior layer, the interior reinforcement structure including;
a first sheet metal member laterally between the first exterior layer and the second exterior layer and connected to each of the first exterior layer and the second exterior layer and having a plurality of vertical sections and a plurality of horizontal sections, wherein the first sheet metal member includes at least one of the plurality of horizontal sections extending from and contacting the first exterior layer and extending to and contacting the second exterior layer; and
wherein the first exterior layer includes a vertical wall section and upper and lower horizontal wall sections, the vertical wall section includes an indent portion wherein one of the plurality of vertical sections of the first sheet metal member is connected to the indent portion of the first exterior layer.

18. The rechargeable energy storage system according to claim 17, further comprising a second sheet metal member formed into a side-by-side double box cross-section that includes a first box cross section disposed adjacent to the first exterior layer and a second box cross section disposed against the first box cross section and adjacent to the second exterior layer.

19. The rechargeable energy storage system according to claim 18, further comprising a third sheet metal member connected to the first exterior layer and having a plurality of vertical sections alternating with a plurality of horizontal sections.

20. The rechargeable energy storage system according to claim 17, further comprising a second sheet metal member connected to the first exterior layer and having a plurality of vertical sections alternating with a plurality of horizontal sections.

* * * * *